Nov. 11, 1930.  E. I. GARFIELD  1,781,380
VEHICLE BODY
Filed June 21, 1928   2 Sheets-Sheet 1

Nov. 11, 1930.  E. I. GARFIELD  1,781,380

VEHICLE BODY

Filed June 21, 1928   2 Sheets-Sheet 2

Inventor
Ellery Irving Garfield
By
Pennie, Davis, Marvin & Edmonds
Attorneys

Patented Nov. 11, 1930

1,781,380

UNITED STATES PATENT OFFICE

ELLERY IRVING GARFIELD, OF PARIS, FRANCE

VEHICLE BODY

Application filed June 21, 1928, Serial No. 287,188, and in France July 19, 1927.

The present invention relates to the construction of vehicle bodies, more particularly to vehicle bodies for use on motor cars.

It is well known that the chassis of a motor car during operation, is constantly subjected to forces tending to deform it. The nature and amount of deformation depends not only on the operating conditions to which the motor car is subjected, but also, and perhaps primarily, on the design and dimensions of the various component parts of the chassis.

If, therefore, a suitable body is fixed to the chassis by means of rigid and bolted connections as is customary, the body is likewise subjected to forces tending to deform it. To resist this deformation, motor vehicle bodies are ordinarily built up around a very rigid frame composed of parts of large cross-section and stiffened by numerous and suitable connecting pieces. Being built to resist deformation, the customary motor vehicle bodies are accordingly practically indeformable, and when solidly affixed to the chassis serve to reinforce the latter to some extent.

However, bodies of the above mentioned rigid construction are heavy, and under the constant subjection of forces tending to deform them, the parts originally rigidly connected tend to loosen and become separated, with the result that squeaks and rattles are produced after the bodies have been subjected to use for some time.

To avoid these disadvantages of bodies of the rigid type of construction, it has been proposed to construct bodies in such a manner that they are deformable, to a greater or lesser extent, depending on the use to which they are to be put and the type of chassis on which they are intended to be mounted. Usually bodies of this deformable type are made by assembling parts of relatively light weight so that deformation of the entire body is possible. When fixed solidly to a chassis, such a deformable body is deformed with the chassis. While at first thought it may appear that deformable bodies, by virtue of their construction, overcome the disadvantages of rigid bodies and thus are preferable to the rigid type, the fact remains that bodies of the deformable type cannot be readily covered with sheet metal, wood or similar materials prevalent among present day motor car bodies. Instead, deformable bodies are of necessity covered with such flexible material as leather, artificial leather, fabrics of suitable form and like materials, which obviously do not possess the weather resistant qualities and durability of sheet metal or wood.

The present invention accordingly relates to the construction of a vehicle body of a type overcoming the disadvantages of both the rigid type of body construction and the deformable type of body construction. A vehicle body as contemplated by the present invention is so constructed as to be capable of distortion or deformation with the chassis and yet is adapted to be covered with either a flexible or inflexible material, depending solely upon the wishes and desires of the user. More specifically, a vehicle body in accordance with the present invention is comprised of a plurality of individual sections so constructed and interconnected as to form a complete body unit, the individual sections of which are adapted to deform with the chassis relatively to one another.

The division of a vehicle body into several virtually separate units each so supported that there is no distortion of each individual unit due to the twisting of the chassis, has been suggested, but in such a construction, each unit is connected to its neighbor by resilient means intended to prevent relative lateral displacement of the units. Likewise, it has been proposed to construct a vehicle body comprising a plurality of incomplete sections interconnected by means of yielding connections adapted to permit relative movement of the units. These units of inverted U shape are assembled directly on the chassis frame or on a floor connected directly to the chassis itself.

According to the present invention, however, a vehicle body is composed of one or more units each consisting of a complete framed structure supporting the side and top coverings, doors, windows and floor, although the latter may be fixed directly to the chassis frame and thus made independent of and not included in the framed structure of each unit. Furthermore, each unit is mounted on transverse supports attached to the chassis frame and so disposed with respect to the center of gravity of the unit that no distortion of the individual units due to twisting of the chassis can occur. To interconnect the units, resilient means are employed, whereby relative lateral displacement or twisting of the units may take place, even though each unit is in itself indeformable.

For a better understanding of the invention, reference is made to the accompanying drawings, wherein Fig. 1 shows, in elevation, a body constructed in accordance with the invention.

Figure 1:
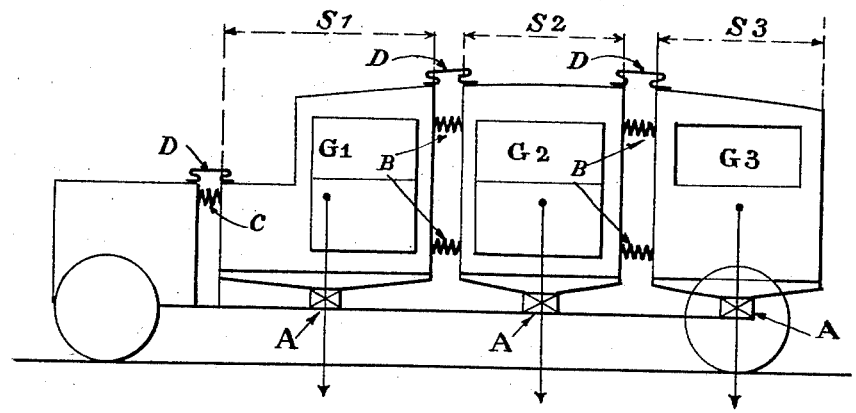
Figure 2:
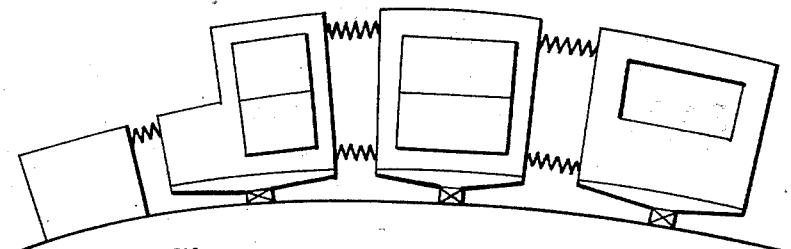
Fig. 2 is a diagrammatic representation of the manner in which the body of Fig. 1 may be longitudinally deformed.
Figure 6:
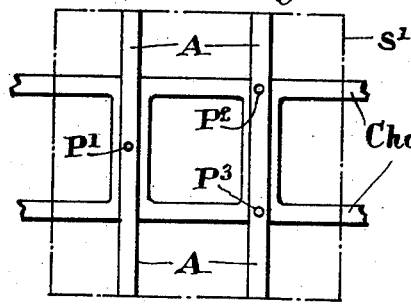
Fig. 6 is a diagrammatic plan view illustrating the manner in which an individual body unit is supported on a chassis frame by the use of three points of support.
Figure 7:
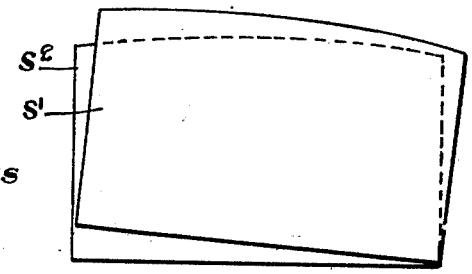
Fig. 7 is a diagrammatic representation illustrating the relative lateral displacement which may occur between adjacent body sections.

Considering the drawings more in detail, Fig. 1 illustrates a vehicle body divided into a plurality of rigidly framed sections, $S_1$, $S_2$, $S_3$. The number of sections is not limited, depending in great measure on the dimensions or on the type of body. The respective centers of gravity of the several units are represented by means of vertical arrows, designated as $G_1$, $G_2$, $G_3$. Each body section or unit is rigidly fixed to the chassis by means of suitable transverse supports A, placed in the vertical plane coincident with the center of gravity of each section, as shown in Fig. 1, or parallel to the plane containing the center of gravity as shown in Fig. 2. These supports A carry the weight of each section. The several sections constituting the body are united by resilient means B, C, to permit relative lateral and longitudinal displacement of the sections. Whenever the chassis is deformed, the several body sections are relatively displaced as shown in Fig. 2 and Fig. 7. Of the resilient means, B designates that employed to provide a yielding connection between the sections, and C designates the yielding means employed to join the dash portion of the vehicle to the main body portion of the vehicle. For the purpose of presenting a pleasing appearance, the joints between the several body sections may be concealed by means of suitable cover joints D, so constructed as to be able to contract and extend whenever the chassis is deformed a sufficient amount to cause relative lateral movement between the sections.

Figure 3:
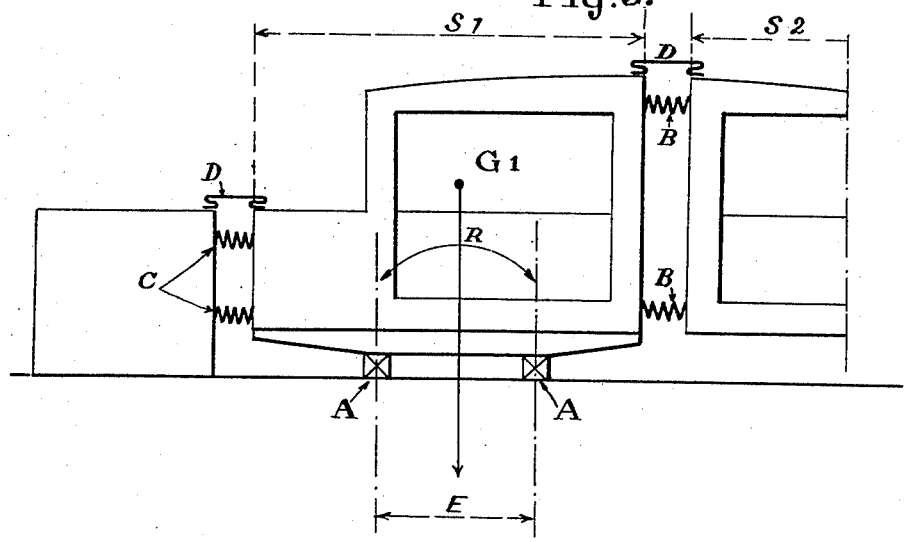
Fig. 3 illustrates, in elevation, a portion of a vehicle body provided with a modified form of mounting.

In the practical realization of a type of body such as I have described, the transverse supports A supporting the weight of the individual sections, are two in number and are so placed on either side of the vertical plane passing through the center of gravity of the section, as to better resist the moment of oscillation R, as indicated in Fig. 3. The distance E between the supports A varies directly with the size of the sections and with the dimensions of the side members of the chassis. That is, the distance between the supports A increases as the size of the section increases. Where the side members of the chassis frame are quite rigid and staunch, the increase or decrease of the distance E need not necessarily be considered from the standpoint of other than the size of the sections. On the other hand, if the side members of the chassis be comparatively small and therefore of less strength, this feature should be considered in determining the most suitable distance E, the distance being always so chosen that the deflection of the side members of the chassis between the supports A can be considered as negligible.

Figure 5:
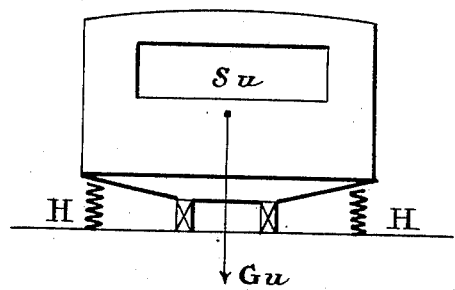
Fig. 5 is an end view of a vehicle body provided with a further embodiment of the present invention.
Figure 4:
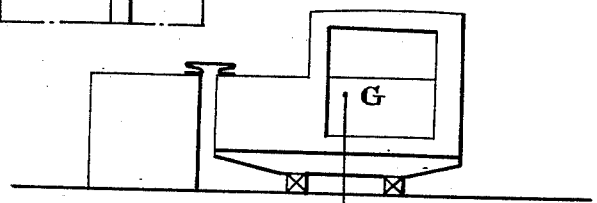
Fig. 4 is a diagrammatic representation of the relation between the center of gravity of each individual unit and the points of support of the unit.

As a further embodiment of the present invention, a form of mounting may be employed which consists in distributing the weight of each section at three points of support on the chassis. This well kown method of supporting a rigid body or rigid body section avoids all deformation or twisting of the individual sections and at the same time, materially improves the stability of the vehicle body as a whole.

Where bodies of small size are to be mounted in accordance with the present invention, they may be safely considered to constitute a single rigid section and as such may be supported as shown in Fig. 4. Furthermore, where separate sections of the vehicle body possess a considerable width, resilient supports of the form shown in Fig. 5 may be satisfactorily employed.

I claim:

1. The combination with a vehicle chassis, of a vehicle body comprising a main body section and a dash or hood section, the main body section comprising a plurality of individual sections, said sections being individually mounted on the vehicle chassis and resilient connections between said sections to permit relative lateral and longitudinal displacement thereof.

2. The combination with a vehicle chassis, of a vehicle body comprising a main body section and a dash or hood section, the main body section comprising at least two rigid component sections of which at least one is rigidly connected at three points of support to said chassis, and resilient connections between said sections to permit relative lateral and longitudinal displacement thereof.

In witness whereof I have hereunto set my hand this 8th day of June, 1928.

ELLERY IRVING GARFIELD.